United States Patent
Musheghyan et al.

(10) Patent No.: US 12,459,420 B2
(45) Date of Patent: Nov. 4, 2025

(54) OPTICAL DEVICE FOR MOTOR VEHICLE

(71) Applicant: ZKW Group GmbH, Wieselburg (AT)

(72) Inventors: Mikayel Musheghyan, Wieselburg (AT); Peter Hartmann, Schönbühel an der Donau (AT); Patrick Schmidt, Wieselburg (AT)

(73) Assignee: ZKW Group GmbH, Wieselburg (AT)

( * ) Notice: Subject to any disclaimer, the term of this patent is extended or adjusted under 35 U.S.C. 154(b) by 44 days.

(21) Appl. No.: 18/648,734

(22) Filed: Apr. 29, 2024

(65) Prior Publication Data

US 2024/0367577 A1    Nov. 7, 2024

(30) Foreign Application Priority Data

May 4, 2023 (EP) .................................... 23171653

(51) Int. Cl.
*B60Q 1/08* (2006.01)
*F21S 41/13* (2018.01)
(Continued)

(52) U.S. Cl.
CPC .............. *B60Q 1/085* (2013.01); *F21S 41/13* (2018.01); *F21S 41/16* (2018.01); *F21S 41/24* (2018.01);
(Continued)

(58) Field of Classification Search
CPC ........ F21S 41/16; F21S 41/365; F21S 41/675; F21W 2103/60
See application file for complete search history.

(56) References Cited

U.S. PATENT DOCUMENTS

2015/0137680 A1* 5/2015 Komatsu .............. B60Q 1/0023
315/82
2015/0317680 A1 11/2015 Richman et al.
(Continued)

FOREIGN PATENT DOCUMENTS

DE    102016205506 A1    10/2017
DE    102020213059 A1    4/2022
JP    2020004517 A    1/2020

OTHER PUBLICATIONS

Extended European Search Report lfor European Patent Application No. 23171653.1 dated Oct. 19, 2023 (38 Pages).

*Primary Examiner* — Eric T Eide
(74) *Attorney, Agent, or Firm* — Eversheds Sutherland (US) LLP

(57) ABSTRACT

An optical device (1) for a motor vehicle, for projecting a graphic element into a region in front of the optical device. The device includes a laser light source (2), an infrared light source (3), a light guiding device (4), an infrared detector (5), a time-of-flight sensor device (6), and a control device (7), wherein the light guiding device is configured to produce a light distribution with laser light from the laser light source and to form an infrared light beam from infrared light from the infrared light source, wherein the infrared detector is configured to detect reflected infrared light from a measurement object and send a first sensor signal, wherein the sensor device is configured to detect a measurement object and send a second sensor signal, wherein the control device is configured to change the light distribution depending on the first sensor signal and the second sensor signal.

20 Claims, 2 Drawing Sheets

(51) Int. Cl.
*F21S 41/16* (2018.01)
*F21S 41/24* (2018.01)
*F21S 41/675* (2018.01)
*H05B 47/13* (2020.01)

(52) U.S. Cl.
CPC ............ *F21S 41/675* (2018.01); *H05B 47/13* (2020.01); *B60Q 2300/32* (2013.01)

(56) References Cited

U.S. PATENT DOCUMENTS

| | | | |
|---|---|---|---|
| 2018/0340664 A1 | 11/2018 | Yang et al. | |
| 2019/0179138 A1* | 6/2019 | Koller | F21S 41/176 |
| 2019/0384054 A1* | 12/2019 | Mukojima | H04B 10/116 |
| 2021/0025561 A1* | 1/2021 | Orlinskiy | F21S 41/125 |
| 2022/0219600 A1 | 7/2022 | Komatsu et al. | |
| 2023/0367012 A1* | 11/2023 | Reinert | G01S 7/4813 |

* cited by examiner

OPTICAL DEVICE FOR MOTOR VEHICLE

CROSS-REFERENCE TO RELATED APPLICATIONS

This application claims priority to European Patent Application No. 23171653.1, filed May 4, 2023, which is incorporated herein by reference.

TECHNICAL FIELD

The invention relates to an optical device for a motor vehicle, in particular for a motor vehicle headlight, for projecting a graphic element into a region in front of the optical device, preferably a traffic area, comprising
 a laser light source for producing and emitting preferably visible laser light, wherein the laser light source is configured to display visible laser light in the form of a graphic element,
 an infrared light source for producing and emitting infrared light,
 a light guiding device for guiding light along a beam path, comprising a first deflection element, for example a beam combination element, a micromirror device and a second deflection element,
 an infrared detector for detecting infrared light, and
 a control device,
 wherein the laser light source is configured to emit laser light along a laser light emission direction, wherein the infrared light source is configured to emit infrared light along an infrared light emission direction, wherein the laser light source and the infrared light source are arranged relative to one another in such a way that the laser light emission direction is substantially parallel to the infrared light emission direction,
 wherein the light guiding device is arranged downstream of the laser light source and the infrared light source along the laser light emission direction and along the infrared light emission direction and is configured to produce a light distribution, in particular a ground projection light distribution or a signal light distribution, in a laser light illumination area in front of the optical device with the laser light from the laser light source, and to generate an infrared light beam from the infrared light from the infrared light source, with which an infrared light illumination area in front of the optical device can be illuminated with infrared light.

The invention relates to a motor vehicle headlight, comprising an optical device.

The invention relates to a motor vehicle comprising a motor vehicle headlight.

The invention further relates to a method for controlling, preferably for safety switch-off, a laser light distribution.

TECHNICAL BACKGROUND

Optical devices for a motor vehicle for projecting a graphic element into a region in front of the optical device, for example a traffic area, are known in the prior art. When using laser light sources to produce the light distribution, it is known, for control, in particular for emergency switch-off of the laser light, to use an infrared light source and an infrared detector coupled thereto. Pedestrians can be detected with the infrared detector for example, wherein following detection, the laser light source is controlled such that the pedestrian is not dazzled with laser light.

However, such optical devices have the drawback that the light beams of laser light and infrared light are controlled separately, which means that the optical devices have a complex structure. Furthermore, if the infrared detector fails, the laser light source can no longer be controlled in line with safety requirements.

SUMMARY OF THE INVENTION

The object of the present invention consists in mitigating or eliminating the disadvantages of the prior art. The object of the invention is therefore in particular to provide an optical device, in which the light distribution that can be produced is reliably and easily controlled.

This object is achieved by an optical device having the features described herein and with a method described here.

According to the invention, in order to produce the light distribution, laser light from the laser light source strikes the first deflection element, which is configured to direct or deflect incident laser light onto the micromirror device, which is configured to receive laser light directed or deflected by the first deflection element and to form the light distribution therefrom, wherein the laser light forming the light distribution is deflected by the micromirror device onto the second deflection element, which is configured to deflect the light distribution in front of the optical device into the laser light illumination area, wherein the laser light follows a first beam path from the laser light source to the second deflection element,
 wherein in order to produce the infrared light beam, infrared light from the infrared light source strikes the first deflection element, which is configured to deflect incident infrared light onto the micromirror device, which is configured to receive infrared light deflected by the first deflection element and to form the infrared light beam therefrom, wherein the infrared light forming the infrared light beam is deflected by the micromirror device onto the second deflection element, which is configured to deflect the infrared light beam in front of the optical device into the infrared light illumination area, wherein the infrared light follows a second beam path from the laser light source to the second deflection element,
 wherein the first beam path and the second beam path have substantially the same course,
 wherein the infrared detector is configured to detect reflected infrared light from a measurement object which is located in front of the optical device and which is struck by the infrared light beam, and to send a first sensor signal to the control device depending on the detected reflected infrared light,
 wherein the optical device further has a time-of-flight sensor device, which is configured to detect a measurement object in a sensor area in front of the optical device and to send a second sensor signal to the control device depending on the detected measurement object,
 wherein the control device is configured to receive the first sensor signal and the second sensor signal, wherein the control device is connected at least to the laser light source and/or the micromirror device for control purposes such that depending on the first sensor signal and the second sensor signal, the control device controls the laser light source and/or the micromirror device in order to change the light distribution depending on the first sensor signal and the second sensor signal.

This has the advantage that if the infrared detector fails, the laser light source and/or the micromirror device can also be controlled on the basis of the second sensor signal, which can be generated by the time-of-flight (TOF) sensor device when a measurement object is detected. Therefore, the laser light source can be switched off for safety reasons or the light distribution can be pivoted, for example, by corresponding control of the micromirror device or the second deflection element, based on two separate sensor signals. Furthermore, there is the advantage that the optical device, in particular the light guiding device has a particularly compact design as the first beam path and the second beam path have substantially the same course. The laser light illumination area and the infrared light illumination area preferably cover, starting from the light guiding device, an equally large solid angle range in front of the optical device. The signal light distribution, which can be produced with the laser light source, is, for example, a DAP (Driver Assistance Projection) light distribution or an LSP (Light Signalling Projection) light distribution. A laser light source can in particular be understood as a device that can produce a laser light distribution in the form of a laser light graphic, wherein the laser light graphic that can be produced can be, for example, a logo or any other graphic element (which can then subsequently be projected by the light guiding device into a traffic area). Visible laser light can be understood as laser light in a wavelength range between approx. 400 nm and 780 nm. Infrared light can be understood as light in a wavelength range between approx. 780 nm and 1 mm. The light distribution of laser light is preferably formed by the micromirror device. The micromirror device can be configured to form the laser light illumination area (or the light distribution) with a first solid angle in front of the optical device and to form the infrared light illumination area with a second solid angle in front of the optical device, wherein the first solid angle and the second solid angle can be different, wherein the respective solid angle can be achieved by corresponding timing of the respective (laser or infrared) light emissions (by coordinated control of the laser light source and the infrared light source) and by corresponding control of the individual micromirrors in the micromirror device. The infrared light illumination area can be defined as the area (or space) in front of the optical device, which can be illuminated with infrared light by the infrared light source in conjunction with the light guiding device. In other words, the infrared light illumination area can be the maximum possible infrared light cone. Similarly, the laser light illumination area can be defined as the area (or space) in front of the optical device, in which a light distribution can be emitted by the laser light source in conjunction with the light guiding device. The light distribution can partially or completely fill the laser light illumination area. The laser light illumination area can in particular also be defined as an environment in front of the optical device that can be illuminated with laser light. The (TOF) sensor device can comprise a photonic mixing device (e.g. a PMD sensor).

It can be provided that the control device is configured to change an orientation of the micromirrors in the micromirror device in such a way that, in response to the received first sensor signal and/or second sensor signal, the light distribution after the change in orientation of the micromirrors is changed in such a way that the measurement object lies outside the light distribution and, in particular, is not illuminated by laser light.

It can be provided that the control device is configured to switch the laser light source off and/or on in response to the received first sensor signal and/or second sensor signal.

It can be provided that the control device is connected to the second deflection element for control purposes such that depending on the first sensor signal and/or the second sensor signal, the control device controls the second deflection element in order to deflect the light distribution, which preferably lies within the infrared light illumination area, from a first position into a second position that is different from the first, depending on the first sensor signal and/or the second sensor signal.

It can be provided that the infrared light illumination area is bigger than the laser light illumination area. The laser light illumination area is preferably a ground area in front of the optical device (in a state in which the optical device is fitted to a motor vehicle headlight or in a motor vehicle).

It can be provided that the sensor area that can be detected in front of the illumination system with the time-of-flight sensor device is bigger than the infrared light illumination area. The sensor area that can be detected with the time-of-flight sensor device is preferably at least twice as big, in particular at least 4 times bigger than the infrared light illumination area. "Bigger" means in this context that a measurement object can be detected in a region that is further away from the optical device. The size of the sensor area and the infrared light illumination area can therefore be regarded as the range of the respective sensor.

It can be provided that the infrared light illumination area and the laser light illumination area at least partially overlap. The infrared light illumination area preferably spans an equally large or larger solid angle range than the laser light illumination area.

It can be provided that the laser light illumination area lies substantially completely within the infrared light illumination area. A measurement object can thus be detected particularly reliably.

It can be provided that the laser light illumination area lies completely within the sensor area. A measurement object can thus be detected particularly reliably.

It can be provided that the infrared light illumination area lies substantially completely within the sensor area.

It can be provided that the first deflection element is configured as a beam combination element, which is configured to receive laser light from the laser light source and infrared light from the infrared light source and direct it onto the micromirror device, wherein the beam combination element can comprise at least one or more converging lenses and/or a dichroic mirror. The beam combination element, in particular the dichroic mirror, is preferably arranged in a telecentric beam path of the laser light and infrared light. At least one converging lens can be arranged upstream and/or downstream of the dichroic mirror.

A motor vehicle headlight can be provided comprising an optical device according to the invention.

A motor vehicle can be provided comprising an optical device according to the invention or a motor vehicle headlight with an optical device according to the invention.

According to the invention, a method is provided for controlling, preferably for safety switch-off, a laser light distribution, in particular a laser light ground projection light distribution or a laser light signal light distribution, wherein the method has the following steps:

providing an optical device or a motor vehicle headlight with an optical device, producing a light distribution with laser light from the laser light source, producing an infrared light beam with infrared light from the infrared light source, producing a sensor area with the sensor device, detecting a measurement object in front of the optical device with the infrared detector and/or with the sensor device, generating a first sensor signal when the measurement object is detected with the infrared detector and/or creating a second sensor signal when the measurement object is detected with the sensor device, and controlling the laser light source and/or the micromirror device with the control device depending on the first sensor signal and/or the second sensor signal in order to change the light distribution depending on the first sensor signal and the second sensor signal in such a way that the detected measurement object is free of laser light.

In the context of this description, the terms "above", "below", "horizontal", "vertical" should be understood as indications of orientation when the optical device is arranged in its normal position of use after having been fitted to a motor vehicle headlight or to a motor vehicle.

BRIEF DESCRIPTION OF THE DRAWINGS

The invention is outlined in more detail below based on a preferred exemplary embodiment, to which it is, however, not limited: In the drawings.

DETAILED DESCRIPTION OF EMBODIMENTS OF THE INVENTION

Figure 1:
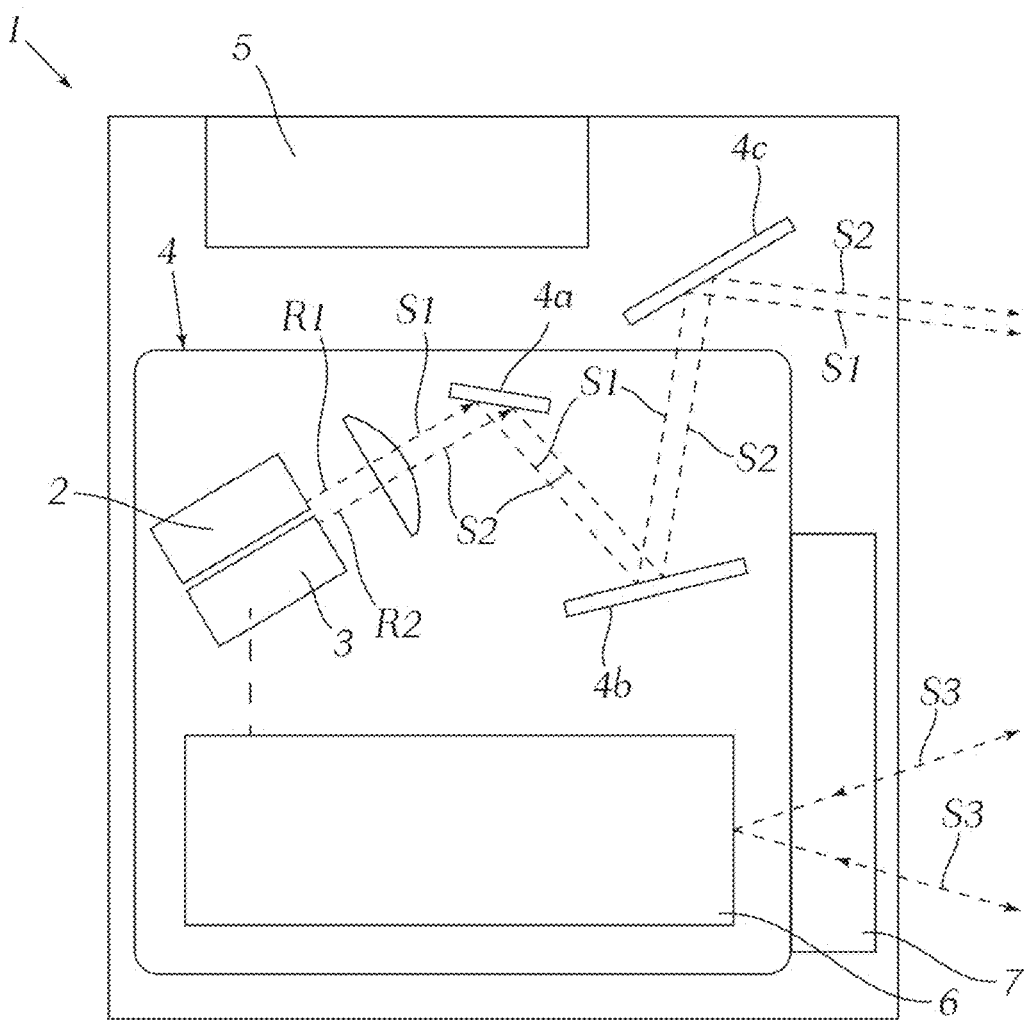
FIG. 1 shows a schematic view of an exemplary embodiment of an optical device according to the invention.

FIG. 1 shows an optical device 1 for a motor vehicle (not shown), in particular for a motor vehicle headlight (not shown), wherein the optical device 1 is configured to project a graphic element in a region in front of the optical device. The region in front of the optical device 1 is, for example, a traffic area.

The optical device 1 comprises a laser light source 2 (or a laser device) for producing and emitting visible laser light. The laser light source is configured to display visible laser light in the form of a graphic element. The graphic element is, for example, a logo, a graphic logo that can be projected, a DAP (Driver Assistance Projection) light distribution or an LSP (Light Signalling Projection) light distribution. The optical device 1 further comprises an infrared light source 3 for producing and emitting infrared light.

A light guiding device 4 is arranged downstream of the laser light source 2 and infrared light source 3 and is configured to guide light along a beam path. To do this, the light guiding device 4 comprises a first deflection element 4a, for example a beam combination element, a micromirror device 4b and a second deflection element 4c.

The optical device 1 further comprises an infrared detector 5 for detecting infrared light, a time-of-flight sensor device 6, and a control device 7.

The laser light source 2 is configured to emit laser light along a laser light emission direction R1. The infrared light source 3 is configured to emit infrared light along an infrared light emission direction R2. The laser light source 2 and the infrared light source 3 are arranged relative to one another in such a way that the laser light emission direction R1 is substantially parallel to the infrared light emission direction R2. Alternatively, a beam combination element can also be arranged downstream of the laser light source 2 and the infrared light source 3, which receives the respective light rays (or light beams) and is configured to direct these in parallel.

The light guiding device 4 is arranged downstream of the laser light source 2 and the infrared light source 3 along the laser light emission direction R1 and along the infrared light emission direction R2 and is configured to produce a light distribution, in particular a ground projection light distribution or a signal light distribution, in a laser light illumination area 2a in front of the optical device 1 with the laser light from the laser light source 2.

The light guiding device 4 is also configured to generate an infrared light beam from the infrared light from the infrared light source 3, with which an infrared light illumination area 3a in front of the optical device 1 can be illuminated with infrared light.

Figure 2:
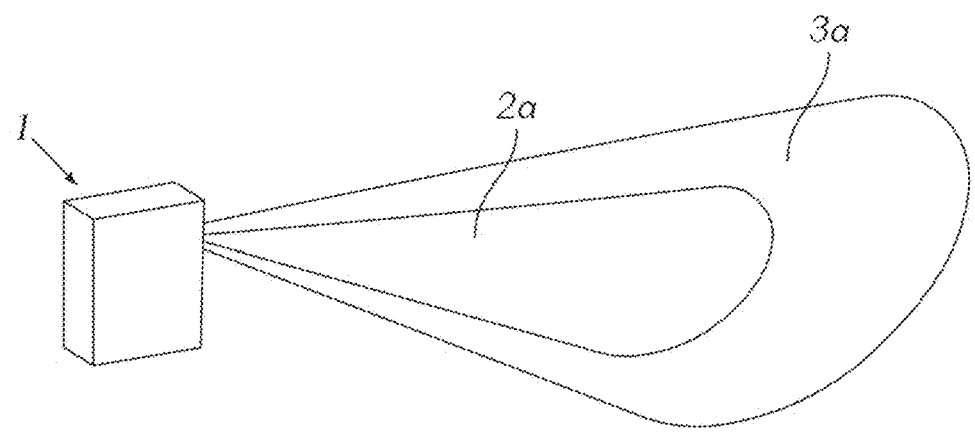
FIG. 2 shows a schematic view of two illumination areas, which can be generated with the optical device according to FIG. 1.

The laser light illumination area 2a and the infrared light illumination are 3a are shown in FIG. 2.

In the exemplary embodiment shown, the infrared light illumination area 3a is bigger than the laser light illumination area 2a. The infrared light illumination area 3a and the laser light illumination area 2a can at least partially overlap. In the exemplary embodiment shown, the laser light illumination area 2a lies completely within the infrared light illumination area 3a. The position of the laser light illumination area 2a can be variable, depending on the laser light distribution produced.

In order to produce the (laser) light distribution, laser light from the laser light source 2 strikes the first deflection element 4a, which is configured to direct or deflect incident laser light onto the micromirror device 4b. The micromirror device 4b is configured to receive laser light directed or deflected by the first deflection element 4a and to form the light distribution therefrom. The laser light forming the light distribution is deflected by the micromirror device 4b onto the second deflection element 4c, which is in turn configured to deflect the light distribution in front of the optical device 1 into the laser light illumination area 2a. The laser light follows a first beam path s1 from the laser light source 2 to the second deflection element 4c.

In order to produce the infrared light beam, infrared light from the infrared light source 3 strikes the first deflection element 4a, which is configured to deflect the incident infrared light onto the micromirror device 4b. This is in turn configured to receive infrared light deflected by the first deflection element 4a and to form the infrared light beam therefrom. The infrared light beam is deflected by the micromirror device 4b onto the second deflection element 4c, which is configured to deflect the infrared light beam in front of the optical device 1 into the infrared light illumination area 3a. The infrared light follows a second beam path s2 from the laser light source 2 to the second deflection element 4c.

The first beam path s1 and the second beam path s2 have substantially the same course.

The infrared detector 5 is configured to detect reflected infrared light from a measurement object (for example a road user) which is located in front of the optical device 1 and which is struck by the infrared light beam. The infrared detector 5 sends a first sensor signal to the control device 7 depending on the detected reflected infrared light.

Figure 3:
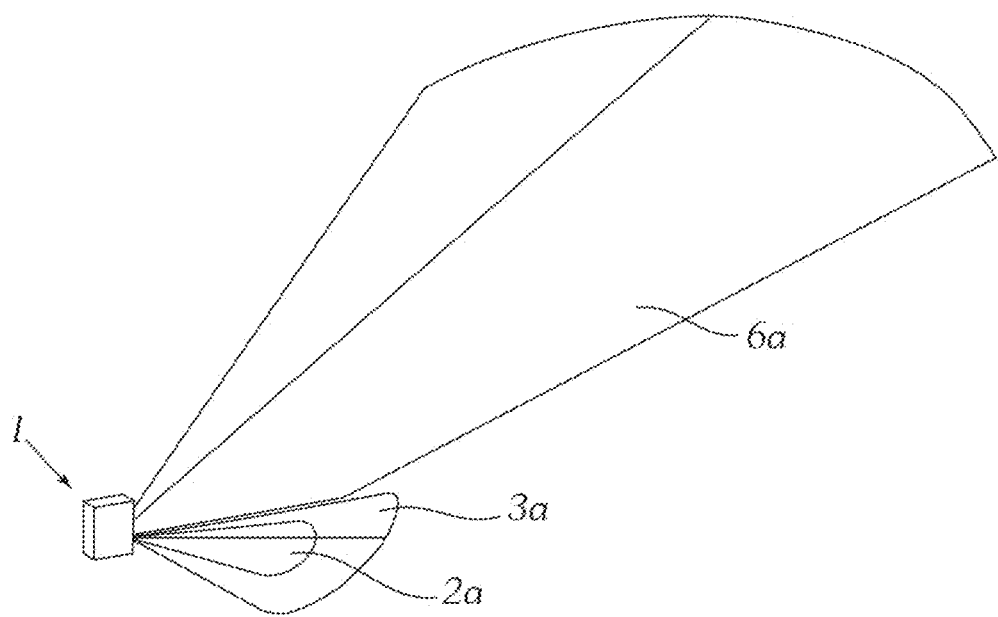
FIG. 3 shows a schematic view of further possible illumination areas.

In addition, the time-of-flight sensor device 6 is configured to detect a measurement object in a sensor area 6a in front of the optical device 1 and to send a second sensor signal to the control device depending on the detected measurement object. The sensor signal 6 emits a time-of-flight sensor signal along a sensor beam path S3. An example of a position of the sensor area 6a relative to the infrared light illumination area 3a and the laser light illumination area 2a is shown in FIG. 3.

In order to control the (laser) light distribution, the control device 7 is configured to receive the first sensor signal and the second sensor signal. The control device 7 is connected to the laser light source 2 and/or the micromirror device 4b for control purposes in order to, depending on the first sensor signal and the second sensor signal, control the laser light source 2 and/or the micromirror device 4b. The light function can thus be changed depending on the first sensor signal and the second sensor signal. This allows the light function to be changed if a measurement object (e.g. a pedestrian) is detected in order to keep the measurement object free from illumination with laser light.

The control device 7 is preferably configured to change an orientation of the micromirrors in the micromirror device 4b in such a way that, in response to the received first sensor signal and/or second sensor signal, the light function after the change in orientation of the micromirrors is changed in such a way that the measurement object lies outside the light distribution and, in particular, is not illuminated by laser light.

In order to be able to perform a safety switch-off, the control device 7 is configured to switch the laser light source 2 off and in response to the received first sensor signal and/or second sensor signal.

The control device 7 can also be connected to the second deflection element 4c for control purposes such that depending on the first sensor signal and/or the second sensor signal, the control device 7 controls the second deflection element 4c. The light distribution, which, for example, lies within the infrared light illumination area 3c, can thus be deflected from a first position into a second position that is different from the first, depending on the first sensor signal and/or the second sensor signal. This can also be used to deflect the laser light area away from a detected measurement object.

As shown in FIG. 3, the sensor area 6a that can be detected in front of the optical device 1 with the time-of-flight sensor device 6 can be bigger than the infrared light illumination area 3a. In the exemplary embodiment shown, the infrared light illumination area 3a lies between the sensor area 6a and the laser light illumination area 2a. However, the areas 2a, 3a and 6a can also overlap either in sections or completely. The position of the laser light illumination area 2a and the infrared light illumination area 3a can preferably be controlled with the second deflection element 4c. The position of the sensor area 6a can be controlled with the sensor device 6. In particular, the positions of the areas 2a, 3a and/or 6a can be aligned in a horizontal plane or rotated about a vertical axis with the second deflection element 4c.

Figure 4:
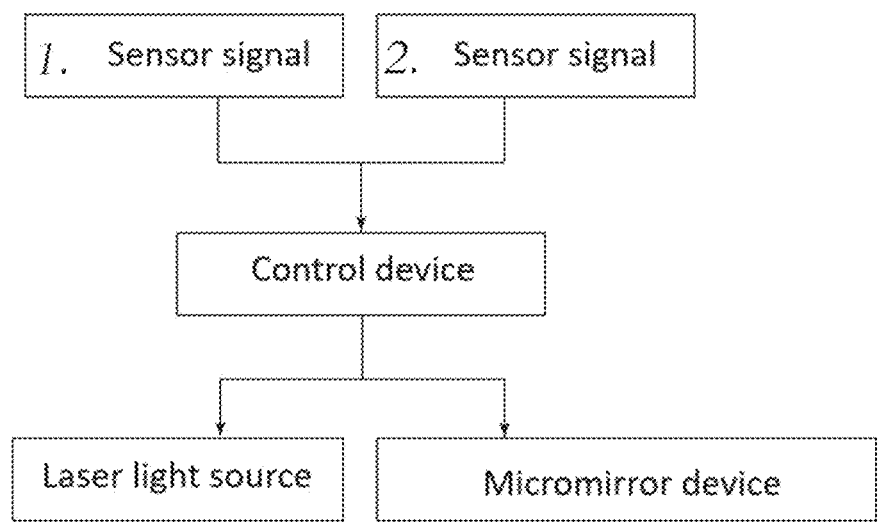
FIG. 4 shows a flowchart, which illustrates an operating mode of the optical device.

FIG. 4 shows a flowchart of a method for controlling the optical device 1 or for controlling (in particular for safety switch-off) a laser light distribution.

In a first step (not shown):
a light distribution is produced with the laser light source 2;
an infrared light beam is produced with the infrared light source 3;
a sensor area 6a is produced with the sensor device 6.

A measurement object can then be detected in front of the optical device 1 by the infrared detector 5, which generates a first sensor signal after detection.

Detection of the same or another measurement object in front of the optical device 1 by the sensor device 6 produces a second sensor signal.

The first sensor signal and the second sensor signal are sent to the control device 7 in a next step.

The control device 7 then controls the laser light source 2 and/or the micromirror device 4b, depending on the first sensor signal and/or the second sensor signal.

The light distribution can thus be changed depending on the first sensor signal and the second sensor signal in such a way that the detected measurement object is free of laser light.

That which is claimed is:

1. An optical device (1) for a motor vehicle for projecting a graphic element into a region in front of the optical device, the optical device comprising:
a laser light source (2) for producing and emitting laser light, wherein the laser light source is configured to display visible laser light in the form of a graphic element;
an infrared light source (3) for producing and emitting infrared light;
a light guiding device (4) for guiding light along a beam path, comprising a first deflection element (4a), for example a beam combination element, a micromirror device (4b) and a second deflection element (4c);
an infrared detector (5) for detecting infrared light; and
a control device (7),
wherein the laser light source (2) is configured to emit laser light along a laser light emission direction (R1), wherein the infrared light source (3) is configured to emit infrared light along an infrared light emission direction (R2), wherein the laser light source (2) and the infrared light source (3) are arranged relative to one another in such a way that the laser light emission direction is substantially parallel to the infrared light emission direction,
wherein the light guiding device (4) is arranged downstream of the laser light source (2) and the infrared light source (3) along the laser light emission direction and along the infrared light emission direction and is configured to produce a light distribution, in particular a ground projection light distribution or a signal light distribution, in a laser light illumination area (2a) in front of the optical device (1) with the laser light from the laser light source (2), and to generate an infrared light beam from the infrared light from the infrared light source (3), with which an infrared light illumination area (3a) in front of the optical device (1) can be illuminated with infrared light,
wherein, in order to produce the light distribution, laser light from the laser light source (2) strikes the first deflection element (4a), which is configured to direct or deflect incident laser light onto the micromirror device (4b), which is configured to receive laser light directed or deflected by the first deflection element (4a) and to form the light distribution therefrom, wherein the laser light forming the light distribution is deflected by the micromirror device (4b) onto the second deflection element (4c), which is configured to deflect the light distribution in front of the optical device (1) into the laser light illumination area (2a), wherein the laser light follows a first beam path (s1) from the laser light source (2) to the second deflection element (4c), wherein in order to produce the infrared light beam, infrared light from the infrared light source (3) strikes the first deflection element (4a), which is configured to deflect incident infrared light onto the micromirror device (4b), which is configured to receive infrared light deflected by the first deflection element (4a) and to form the infrared light beam therefrom, wherein the infrared light forming the infrared light beam is deflected by the micromirror device (4b) onto the second deflection element (4c), which is configured to deflect the infrared light beam in front of the optical device (1) into the infrared light illumination area (3a), wherein the infrared light follows a second beam path (s2) from the laser light source (2) to the second deflection element (4c), wherein the first beam path (s1) and the second beam path (s2) have substantially the same course, wherein the infrared detector (5) is configured to detect reflected infrared light from a measurement object which is located in front of the optical device (1) and which is struck by the infrared light beam, and to send a first sensor signal to the control device (7) depending on the detected reflected infrared light, wherein the optical device (1) further has a time-of-flight sensor device (6), which is configured to detect a measurement object in a sensor area (6a) in front of the optical device (1) and to send a second sensor signal to the control device depending on the detected measurement object, wherein the control device (7) is configured to receive the first sensor signal and the second sensor signal, wherein the control device (7) is connected at least to the laser light source (2) and/or the micromirror device (4b) for control purposes such that depending on the first sensor signal and the second sensor signal, the control device (7) controls the laser light source (2) and/or the micromirror device (4b) in order to change the light distribution depending on the first sensor signal and the second sensor signal.

2. The optical device (1) according to claim 1, wherein the control device (7) is configured to change an orientation of the micromirrors in the micromirror device (4b) in such a way that, in response to the received first sensor signal and/or second sensor signal, the light distribution after the change in orientation of the micromirrors is changed in such a way that the measurement object lies outside the light distribution and, in particular, is not illuminated by laser light.

3. The optical device (1) according to claim 1, wherein the control device (7) is configured to switch the laser light source (2) off and/or on in response to the received first sensor signal and/or second sensor signal.

4. The optical device (1) according to claim 1, wherein the control device (7) is connected to the micromirror device (4b) for control purposes such that depending on the first sensor signal and/or the second sensor signal, the control device (7) controls the micromirror device (4b) in order to deflect the light distribution, which lies within the infrared light illumination area (3c), from a first position into a second position that is different from the first, depending on the first sensor signal and/or the second sensor signal.

5. The optical device (1) according to claim 1, wherein the control device (7) is connected to the second deflection element (4c) for control purposes such that the control device (7) controls the second deflection element (4c) in order to direct the light distribution together with the infrared light illumination area (3c) from a first emission direction to a second emission direction that is different from the first.

6. The optical device (1) according to claim 1, wherein the infrared light illumination area (3a) is bigger than the laser light illumination area (2a).

7. The optical device (1) according to claim 1, wherein the sensor area (6a) that can be detected in front of the optical device (1) with the time-of-flight sensor device (6) is bigger than the infrared light illumination area (3a).

8. The optical device (1) according to claim 1, wherein the infrared light illumination area (3a) and the laser light illumination area (2a) at least partially overlap.

9. The optical device (1) according to claim 1, wherein the laser light illumination area (2a) lies substantially completely within the infrared light illumination area (3a).

10. The optical device (1) according to claim 1, wherein the laser light illumination area (2a) lies completely within the sensor area (6a).

11. The optical device (1) according to claim 1, wherein the infrared light illumination area (3a) lies substantially completely within the sensor area (6a) or laterally next to the sensor area (6a).

12. The optical device (1) according to claim 1, wherein the first deflection element (4a) is configured as a beam combination element, which is configured to receive laser light from the laser light source (2) and infrared light from the infrared light source (3) and direct it onto the micromirror device (4b) such that the laser light is oriented substantially parallel to the infrared light, wherein the beam combination element comprises at least one or more converging lenses and/or a dichroic mirror.

13. A motor vehicle headlight comprising an optical device (1) according claim 1.

14. A motor vehicle comprising an optical device (1) according to claim 1.

15. A method for controlling a laser light distribution, the method comprising the following steps:
providing an optical device (1) according to claim 1;
producing a light distribution with laser light from the laser light source;
producing an infrared light beam with infrared light from the infrared light source;
producing a sensor area (6a) with the sensor device (6);
detecting a measurement object in front of the optical device (1) with the infrared detector (5) and/or with the sensor device (6);
generating a first sensor signal when the measurement object is detected with the infrared detector (5) and/or creating a second sensor signal when the measurement object is detected with the sensor device (6); and
controlling the laser light source (2) and/or the micromirror device (4b) with the control device (7) depending on the first sensor signal and/or the second sensor signal in order to change the light distribution depending on the first sensor signal and the second sensor signal in such a way that the detected measurement object is free of laser light.

16. The optical device (1) according to claim 1, which is for a motor vehicle headlight of the motor vehicle, wherein the optical device is configured to project the graphic element into a traffic area in front of the optical device.

17. The optical device (1) according to claim 1, wherein the laser light source (2) is configured to produce and emit visible laser light.

18. The optical device (1) according to claim 5, wherein the control device (7) is configured to switch the laser light source (2) on in response to the received first sensor signal and/or second sensor signal.

19. The method according to claim 15, which is adapted for controlling safety switch-off of the laser light distribution.

20. The method according to claim 15, wherein the laser light distribution is a laser light ground projection light distribution or a laser light signal light distribution.

* * * * *